(12) United States Patent
Elliott

(10) Patent No.: US 6,926,265 B1
(45) Date of Patent: Aug. 9, 2005

(54) VEHICLE POST SAFETY GUARD

(76) Inventor: Raymond Elliott, 22909 Adolph Ave., Torrance, CA (US) 90505

( * ) Notice: Subject to any disclaimer, the term of this patent is extended or adjusted under 35 U.S.C. 154(b) by 8 days.

(21) Appl. No.: 10/688,549

(22) Filed: Oct. 17, 2003

Related U.S. Application Data

(60) Provisional application No. 60/420,345, filed on Oct. 23, 2002.

(51) Int. Cl.[7] .......................... F16M 9/00; B60R 19/18
(52) U.S. Cl. .................. 267/140; 293/102; 248/345.1; 16/86 A
(58) Field of Search ............................. 411/356, 372.5, 411/480, 484, 507; 293/102; 267/139, 140; 248/345.1; 16/86 R, 86 A

(56) References Cited

U.S. PATENT DOCUMENTS

| | | | |
|---|---|---|---|
| 32,527 A * | 6/1861 | Nichols et al. ............. | 411/480 |
| 170,854 A * | 12/1875 | Hincks ....................... | 411/480 |
| 351,509 A * | 10/1886 | Hertz ....................... | 248/345.1 |
| 497,154 A * | 5/1893 | Wimer ....................... | 411/484 |
| 3,819,153 A * | 6/1974 | Hurst et al. ............... | 254/93 R |
| 3,969,786 A * | 7/1976 | Peak .......................... | 16/86 A |
| 4,370,373 A * | 1/1983 | Janicz ........................ | 428/151 |
| 4,605,265 A * | 8/1986 | Bessinger et al. ............ | 384/20 |
| 5,021,279 A * | 6/1991 | Whitener .................... | 428/100 |

* cited by examiner

*Primary Examiner*—Dennis H. Pedder
(74) *Attorney, Agent, or Firm*—Roger A. Marrs

(57) ABSTRACT

A protective bumper or guard having a substantial thickness of semi-rigid material formed in a geometric configuration, such as a dome, which will not catch or snag personnel or garments moving about structures such as posts having jagged edges or points. The protective bumper or guard incorporates a downwardly depending shaft having one end exposed in the form of a wedge for insertion between crimped portions of the damaged structure, while the opposite end of the shaft includes a head for retaining the shaft in a secured fitting with the semi-rigid pad or body. Preferably, the semi-rigid pad or body is dome-shaped, having a flat bottom, whereby sharp edges and points of damaged structure can impact or slightly penetrate into the material when the wedge has been inserted into the crimped closing of the post or structure. A sufficient portion of the pad or body exists between the secured portion of the shaft with the body so that a person engaging the pad will not feel or snag on the shaft. Weight is reduced by removing material which defines reinforced ribs while maintaining flexibility.

7 Claims, 2 Drawing Sheets

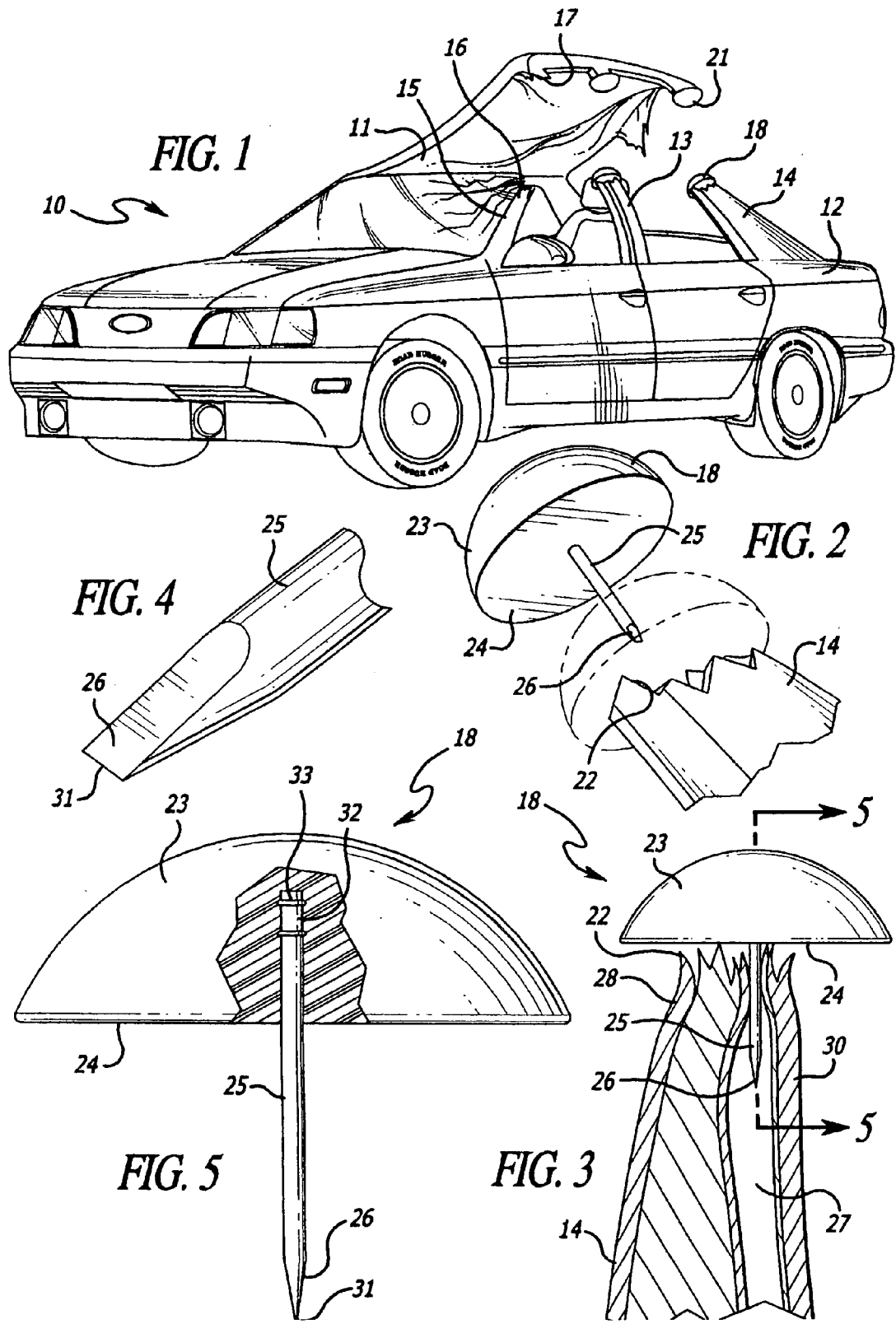

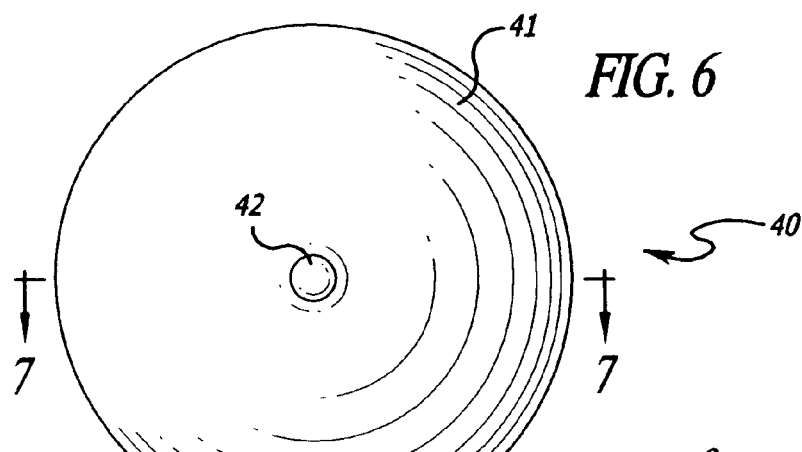
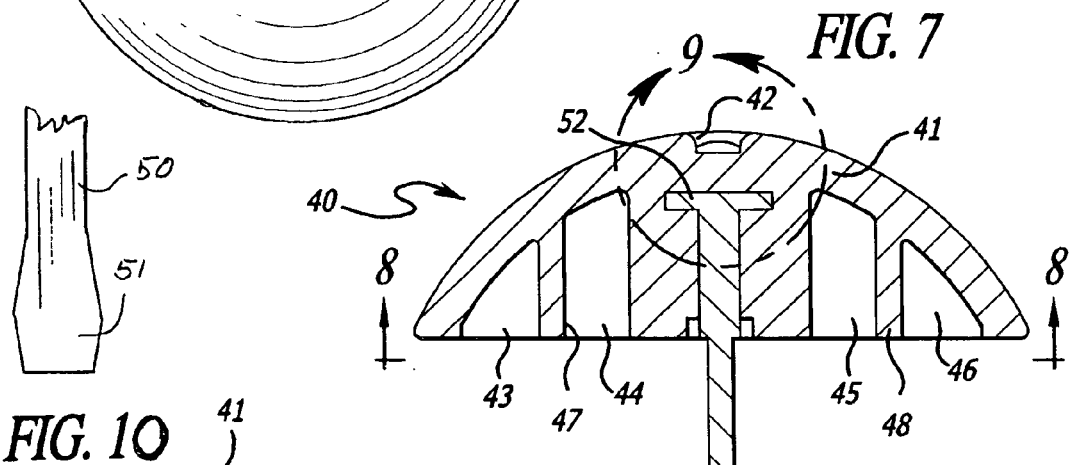
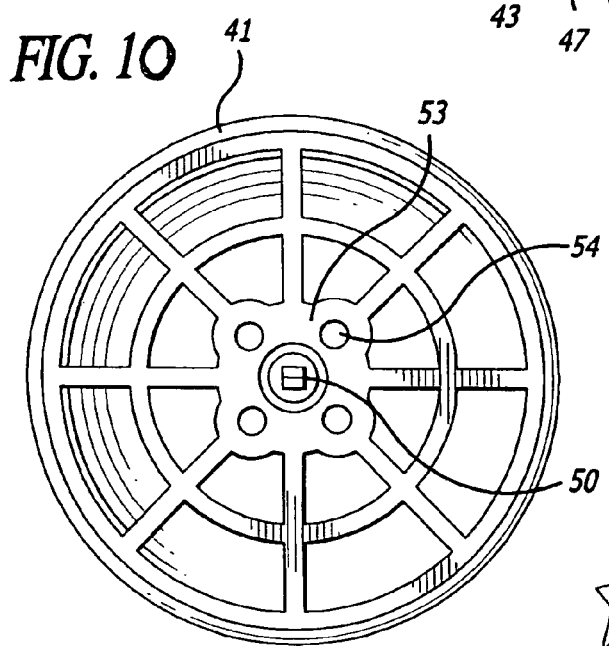
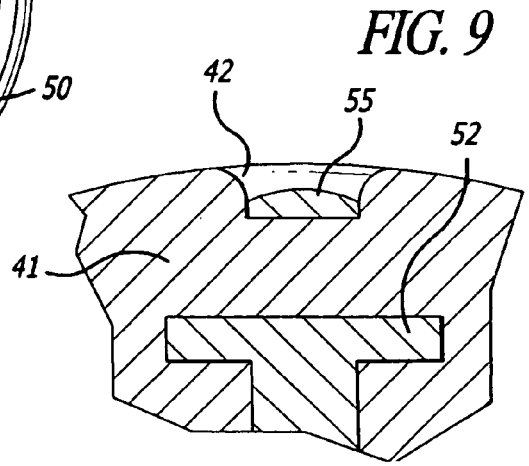

VEHICLE POST SAFETY GUARD

Priority claimed on Ser. No. 60/420,345 filed Oct. 23, 2002.

BACKGROUND OF THE INVENTION

1. Field of the Invention

The present invention relates to the field of personnel protective devices, and more particularly to a novel protective bumper or guard that may be placed on jagged or sharp protuberances which would normally interfere with maneuvering of emergency personnel such as when emergency personnel assist victims after an automobile accident.

2. Brief Description of the Prior Art

It is the conventional practice after an automobile accident for emergency personnel to arrive at the scene and use special hydraulic equipment for removing a portion of the automobile in order to gain access to trapped victims. During such a procedure, such automobile portions as the roof of the vehicle are removed or separated from supporting posts in such a manner that the severance portion of the post is crimped providing sharp edges and points. Such sharp edges and points terminating at the end of the remaining posts greatly interfere with movement of the emergency personnel in that their clothes, equipment and portions of their body are snagged by the exposed sharp edges and points so that the rescue operation is greatly impaired and substantial injury or damage to the emergency personnel is experienced. Some attempts have been made to avoid such an occurrence whereby the rescuing personnel may use pry bars or hammers to flatten or eliminate such jagged portions of the posts; however, such a procedure delays the rescue operation wherein precious time is lost for attending to the injured victim.

Therefore, a long-standing need has existed to provide a device whereby emergency personnel can readily cap-off the sharp terminating edges of remaining posts after a structure, such as an auto roof, has been removed. Such a protector or cap must be readily installed in the simplest manner and must provide sufficient protection for maneuvering personnel so that equipment or bodily injury is avoided.

SUMMARY OF THE INVENTION

Accordingly, the above problems and difficulties are avoided by the present invention which provides a protective bumper or guard which has a substantial thickness of semi-rigid material formed in a geometric configuration, such as a dome, which will not catch or snag personnel or their garments while moving about structures such as posts, having jagged edges or points. The protective bumper incorporates a downwardly depending shaft having one end exposed in the form of a wedge for insertion between crimped portions of the damaged structure, while the opposite end of the shaft includes means for retaining the shaft in a secured fitting with the semi-rigid pad or body. Preferably, the semi-rigid pad or body is dome-shaped, having a flat bottom, whereby sharp edges and points of damaged structure can impact or slightly penetrate into the material when the wedge has been inserted into the crimped closing of the post or structure. A sufficient portion of the pad or body exists between the secured portion of the shaft with the body so that a person engaging the pad will not feel or snag on the shaft. Weight is reduced by removing material which defines reinforced ribs while maintaining flexibility.

Therefore, it is among the primary objects of the present invention to provide a novel protective bumper that may be readily inserted into the crimped portion of a damaged post or shaft whereby personnel moving about the damaged structure will not be injured or impeded by contact with or engagement with the damaged structure.

Another object of the invention is to provide a novel protective bumper that may be readily installed on a jagged or damaged structure so as to protect maneuvering emergency personnel as such personnel perform their official duties.

Still a further object of the present invention is to provide a protective bumper having a semi-rigid pad with a downwardly depending wedge element so that the bumper may be readily installed by insertion of the wedge into the damaged structure.

Still another object resides in providing a protective bumper or guard for emergency personnel which will not only be readily installed on damaged structure, but will accept limited penetration of sharp edges or jagged portions of the structure into the guard itself so as to separate emergency personnel from the damaged structure.

Yet a further object resides in reducing weight of the bumper or guard by removing excess material from the body of the bumper or guard whereby a web of reinforcement ribs are provided while maintaining a flexing characteristic.

Additionally, provision is made for storing a combination of bumpers or guards in tandem or pairs thereby providing convenient storage and ready accessibility.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of a vehicle having a portion of the roof removed so as to expose jagged and sharp edges of remaining posts and having a protective bumper or guard installed on such posts in accordance with the present invention;

FIG. 2 is a greatly enlarged perspective view of the protective bumper or guard illustrated in a position preparatory for installation on the jagged terminating end of a post;

FIG. 3 is a cross-sectional view of a post having a terminating jagged end illustrating the novel protective bumper or guard installed thereon;

FIG. 4 is a greatly enlarged perspective view of the wedge end of the shaft carried on the semi-rigid body or pad portion of the protective bumper illustrated in FIGS. 2 and 3;

FIG. 5 is a side elevational view, partly in section, of the protective bumper or guard incorporating the present invention;

FIG. 6 is a top plan view of another embodiment of the present invention;

FIG. 7 is a transverse, cross-sectional view the bumper or guard showing in FIG. 6 as taken in the direction of arrows 7—7 thereof;

FIG. 8 is a bottom of the bumper or guard version shown in FIG. 7 as taken in the direction of arrows 8—8; and FIG. 9 is an enlarged, fragmentary view, in section, of an identification means as taken in FIG. 7 by the arrows 9—9.

FIG. 10 is a side-elevational view of the wedge employed on the shaft shown in FIG. 7.

DESCRIPTION OF PREFERRED EMBODIMENT

Referring to FIG. 1, a conventional vehicle is illustrated in the general direction of arrow 10 which is illustrated as having a roof 11 substantially separated from a body 12 of the vehicle through the use of hydraulic equipment, such as the well-known "jaws-of-life". In separating the roof 11 from the body 12, a plurality of posts, such as posts 13 and 14, as well as post 15, represent upwardly projecting posts that terminate in jagged and sharp edges, such as indicated by terminating end 16 of post 15. Also, it is noted that portions of the severed posts also remain on the underside of the roof 11, and such a jagged remnant is indicated by numeral 17. Therefore, it can be seen that leaving such jagged post ends uncovered presents a danger to equipment, clothing and the body of rescuers and emergency personnel that are required to enter the vehicle in the performance of their official duty. To avoid possibility of contact with personnel from the jagged ends of the posts, a protective bumper 18, in accordance with the present invention, has been installed on the end of post 14 and an identical protective bumper 21 has been installed on an upper jagged post end.

Referring now in detail to FIG. 2, it can be seen that the post 14 terminates in a jagged and sharp edge 22 when the hydraulic equipment has been employed to sever the post in order to raise the roof 11. The protective bumper 18 is illustrated preparatory for installation on the post 14 and the bumper includes a body portion of dome-shape, illustrated by numeral 23, and which has a flat bottom 24 facing the jagged edge 22. Therefore, when the bumper 18 is installed on the end of the post 14, a shaft 25 having a wedge terminating end 26 is inserted or forced into the post 14, so that the shaft penetrates well into the post so as to cause the jagged edge 22 to bear or even press into the bottom 24 of the bumper 18.

Referring now in detail to FIG. 3, it can be seen that the post 14 usually includes a central cavity 27 defined between metal pieces 28 and 30 respectively. However, when the hydraulic equipment is used to separate or break the post 14 to release the roof 11, the sides 28 and 30 are crimped together as the metal is pressed and simultaneously cut. Therefore, the jagged edge 22 is exposed and constitutes a danger to equipment and personnel. It can be seen that when the wedge 26 is inserted into the crimp between the adjacent sides or portions of the post 14 and as pressure is applied to the body member 23, the wedge and shaft 25 are forced into securement of the bumper with the end of the post. Also, the sharp edges of the jagged edge 22 are impressed into the underside or bottom 24 of the body or member 23. The opposing sides of the post 14 serve to clamp and hold the shaft 25 into position, so that as emergency personnel bump, slide or engage the member 23, not only are the personnel protected but the bumper will remain installed on the end of post 14.

Referring to FIG. 4, it can be seen that the extreme terminating or distal end of shaft 25 results in a pre-formed wedge having a tip 31 easily inserted between the sides of the post 14 for pressable insertion of the shaft therebetween. The cross section of the shaft may be round, square or of any desired configuration.

Referring now to FIG. 5, it can be seen that the bumper pad or body 23 is composed of a semi-rigid material, such as foam, plastic or the like. The top of the pad or body 23 is rounded so as to be dome-shaped overall, while the bottom 24 is preferably flat and will accommodate engagement and possible embedding of the sharp edges 22 of post 14. It can also be seen that the shaft 25 is composed of rigid material, such as metal, and that the end of the shaft, as indicated by numeral 32, terminates in circular ridges, such as ridge 33, so that the shaft is completely embedded within the body or pad 22 and the ribs will retain the shaft in a position so that its major length is normal to the bottom 24. Also, it is noted that the shaft is placed in the center of the pad 23 so that the bottom 24 extends outwardly on the shaft in order to receive the sharp end or jagged end 22 of the post when the shaft is inserted therein.

Referring to FIG. 6, another embodiment of the present invention is illustrated in the general direction of arrow 40 wherein the bumper or guard is indicated by numeral 41 and is a top view thereof. The bumper or guard is dome shaped and the apex of the dome terminates in a recess 42 in which an identification disk or label may be affixed. The identification is recessed within the cavity 42 so that it will not easily be removed.

Referring now in detail to FIG. 7, it can be seen that the bumper or guard 41 is composed of a semi-rigid material so that a body will slightly flex in order to accommodate application of load factors. It is to be particularly noted that the body of the bumper or guard has had a substantial amount of material removed so as to provide cavities 43, 44, 45 and 46. Not only do these cavities reduce the weight of the article but define a plurality of reinforcement ribs such as ribs 47 and 48. An elongated shaft 50 is provided as previously described which terminates at its distal end in a wedge shape 51, while its opposite end includes a "T head" 52 that is embedded in or molded in the material of the bumper or guard 41. The head 52 includes outwardly projecting flanges which securely retain the shaft 50 along the center longitudinal axis of the bumper or guard.

As shown in FIG. 8, the cavities formed in the body leave a substantial core 53 which serve to provide openings, such as opening 54. These openings may be employed to receive shafts 50 from another bumper or guard so that the pair or combination may be stored in a convenient manner. The shaft of one guard will fit into the hole 54 of the other bumper or guard and the second shaft will fit into a similar hole in the first bumper or guard. They may be easily pulled apart when in actual use.

Referring to FIG. 9, it can be seen that a label or ID disk 55 is residing within the recess 42. Also, it can be seen that the shaft head 52 is securely embedded in the material of the body 41.

FIG. 10 shows the wedge 51 at the distal end of the shaft 50. The shaft is square in cross-section and the tip of the wedge is diagonal across from corner to corner.

Therefore, it is seen that the protective bumper or guard 18 can readily be installed on or through the jagged end of post 14 or the like and that the semi-rigid pad or body 23 separates a person and his equipment from engaging with the sharp edges. The protective bumper may be withdrawn at the end of an emergency procedure and can be reused repeatedly. Also, the wedge and shaft can readily be inserted in the crimped end of the post 14 by manual pressure and the use of accessory or auxiliary equipment is not necessary.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A bumper or guard comprising:
    a thickened pad having a flat bottom;
    an elongated shaft having a distal end providing a wedge and an opposite end having a retention head;
    said head embedded in said pad with said shaft outwardly projecting from said pad;
    said pad is dome-shaped with a flat circular underside;
    said shaft projecting from said flat circular underside along a longitudinal axis of said pad;
    said pad composed of a semi-rigid material adapted to permit penetration by jagged edges;
    said pad includes a plurality of cavities opening through said flat circular bottom; and
    said cavities defining a plurality of reinforcement ribs.

2. A protective bumper or guard comprising:
    a dome-shaped pad of semi-rigid material;
    said pad having a flat bottom defined by a circular peripheral edge;
    an elongated shaft of rigid material having a wedged tip at one of its two ends and a retention head at its other end for securement in said pad;
    said head having outwardly projecting flanges embedded in said semi-rigid material for retaining said shaft along a central longitudinal axis of said pad;
    said pad adapted to receive penetration of jagged edges and points;
    said dome-shaped pad having an apex with a recess therein; and
    an identification disk secured in said recess below and an exterior surface of said pad.

3. The bumper or guard defined in claim 1 including:
    a core provided in said pad joined by said reinforcement ribs; and
    said shaft outwardly projecting from said core.

4. The bumper or guard defined in claim 3 wherein:
    said distal end includes a pair of flat surfaces converging together to form a wedge tip.

5. The protective bumper or guard defined in claim 2 including:
    a plurality of cavities in said semi-rigid material opening through said flat bottom to define a plurality of reinforcement ribs.

6. The protective bumper or guard defined in claim 5 including:
    a central core between said cavities for supporting said shaft so as to cantilever outwardly from said pad from said flat bottom.

7. The protective bumper or guard defined in claim 6 wherein:
    said semi-rigid material is of a flexible and soft composition.

* * * * *